(12) United States Patent
Nakamiya et al.

(10) Patent No.: US 7,130,151 B2
(45) Date of Patent: Oct. 31, 2006

(54) DISK DEVICE AND UNBALANCE CORRECTING METHOD THEREOF

(75) Inventors: Teruhiro Nakamiya, Chiyoda (JP); Takashi Kouno, Chiyoda (JP); Toshihisa Okazaki, Odawara (JP); Masatoshi Horinouchi, Odawara (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 337 days.

(21) Appl. No.: 10/682,029

(22) Filed: Oct. 10, 2003

(65) Prior Publication Data

US 2005/0047003 A1    Mar. 3, 2005

(30) Foreign Application Priority Data

Sep. 3, 2003    (JP)    ............................. 2003-310933

(51) Int. Cl.
*G11B 17/08*    (2006.01)
(52) U.S. Cl. .................................................. 360/98.07
(58) Field of Classification Search ............ 360/98.07, 360/99.08, 99.04
See application file for complete search history.

(56) References Cited

U.S. PATENT DOCUMENTS 6,356,409 B1*    3/2002    Price et al. .............. 360/98.07
6,608,733 B1*    8/2003    Elsing ..................... 360/99.08

FOREIGN PATENT DOCUMENTS

JP        11-353788        12/1999

* cited by examiner

*Primary Examiner*—George J. Letscher
(74) *Attorney, Agent, or Firm*—Antonelli, Terry, Stout and Kraus, LLP.

(57) ABSTRACT

In a disk device, having disks 2 and a hub 4 for holding thereof, to be attached onto a shaft 5 of a spindle motor, for rotary drive thereof, a groove 42 is formed on a bottom surface of a flange portion 41 of the hub 4, for receiving therein. A balance weight 8 to be received in this groove 42 has elasticity and an outer configuration of about "C", and further, in a portion thereof is attached at least one (1) piece of an auxiliary weight or more, thereby achieving unbalance correction at high accuracy with an aid of the balance weight. After being attached with one (1) piece or more of the "U" shaped auxiliary weight(s) directing it/them from an inner periphery to an outer periphery thereof, the "C" shaped balance weight is inserted or fitted into, while being suppressed a little bit in an inside thereof. Therefore, a disk device and the unbalance correcting method for that, can be obtained, in which spaces necessary for attaching and detaching are less, but enabling the balance correction at high accuracy.

17 Claims, 3 Drawing Sheets

$$\vec{A}+\vec{B} = |\vec{A}|\cdot|\vec{B}|\cos\theta$$

DISK DEVICE AND UNBALANCE CORRECTING METHOD THEREOF

BACKGROUND OF THE INVENTION

The present invention relates to a disk device, for recording and/or reproducing information thereon, such as, a magnetic disk and/or an optical disk, etc., and it relates to, in particular, a disk device, being equipped with a balance adjustment mechanism therein, thereby enabling suppressing of vibration generated when the disk-like recording medium rotates.

With a disk device for recoding/reproducing data on a rotating disc-like information-recording medium, such as, a magnetic disk device, for example, if vibration comes to be large due to rotation of primary swing-round, which is generated accompanying with rotation of the disk, there is a danger that errors occur in recording/reproducing operation of information on the disk. In particular, in recent years, the rotation speed of the disk comes up to be high for the purpose of improvement of transfer speed of data, and accompanying with this; therefore, it has a potential that the vibration of swing-round becomes large. For this reason, it comes to be more important than before, to reduce an amount of unbalance between the disk and a hub holding the disk thereon, thereby reducing the swing-round vibration thereof.

On the other hand, in the conventional art, in general, it is conducted by attaching a balance weight onto the hub, holding the disk(s) thereon and rotating together with, thereby reducing an amount of unbalance thereof. For example, a balance weight (a stop ring) being "C"-like in the outer configuration thereof, is attached on an inner periphery surface of a concave portion, which is formed in a part of the hub mentioned above (e.g., on both end surfaces in a direction of rotation shaft thereof). Further, the balance weight (or the stop ring) is a little bit larger in the diameter thereof than the inner diameter of the hub mentioned above, and therefore, it will not come out nor be shifted in the position thereof when the hub rotates at a high speed. However, according to such the method of fitting each of the balance weights into each of the surfaces, it is difficult to make adjustment on an amount of unbalance, in particular, when a specification required for balance comes to be strict, accompanying with the high-speed of the disk rotation, it is impossible to cope with or satisfy such the requirement, sufficiently.

Namely, in order to attach the balance weight onto the hub, it is necessary to form a ring-like groove, in a portion of the hub, around the rotation center thereof. And, for each of the balance weights, one (1) piece of groove is necessary in a circular-like shape, therefore a plural number of the circular-like grooves must be formed when attaching the balance weights in a plural number thereof. Further, by taking a repair on the apparatus into the consideration, it is also necessary to form the grooves, but further more in the number than that, with separating them from each other thereon, so as to ensure sufficient spaces for attaching and removing the balance weights, in particular, when making repair on the apparatus. Accordingly, it is difficult to ensure such the sufficient spaces for mounting or attaching the balance weights thereon.

Then, with the conventional art that is shown, such as, in Japanese Patent Laying-Open No. Hei 11-353788 (1999), for example, there is already proposed a magnetic disk device equipped with a balance adjustment mechanism therein. Thus, according to this conventional art, the balance weights (or the stop rings) in the "C" shape are attached on an inner periphery surface of the hub, piling at least two (2) pieces thereof up and down.

Further, with the balance correction mechanism according to this conventional art, a plural number (e.g., two (2) pieces) of the balance weights are fitted or inserted, while shifting the position thereof from one another, when being attached. With this, since an unbalance vector for correction can be formed through addition of the unbalance vectors in a plural number of the balance weights, it is possible to obtain the unbalance vector for correction, having an arbitrary magnitude thereof, but without increasing a number of types or shapes of the balance weights.

In more details, the balance weights, according to the conventional art mentioned above, are attached on the hub, so that the rotation center of the hub comes into an inside of a circle defined by the outer configuration thereof. This is for the purpose of preventing the balance weights from coming out due to the centrifugal force generated at the high rotation speed. And, this "C" shaped balance weight is inserted into from an inside of the hub, being suppressing a little bit into an inside thereof from a condition of non-load thereupon, therefore it is possible to ensure or keep a holding force of the balance weight even when it is not rotated, and also, it acts in a direction to enhance the holding force when the centrifugal force is generated due to the rotation thereof. Since the balance weights of the "C" shape are attached, being compressed a little bit into the inside so as to prevent it from coming out even in the non-rotation condition, it is manufactured to define an arc being equal or greater than 180 degrees in the central angle thereof.

However, with such the balance weights according to the conventional art mentioned above, it has a problem from a viewpoint of the space for mounting or attaching thereof, and it is impossible to adjust or correct the balance at high accuracy. Namely, it is the structure of fitting a plural number (e.g., two (2) pieces) of the balance weights, and the grooves must be formed to be deeper, comparing to that for receiving one (1) piece of the balance weight therein, therefore, though depending on the structure thereof, it is impossible to form such the deep grooves in the hub, thereby resulting into a case where they cannot be attached thereon.

Also, as was mentioned in the above, as the requirement becomes much strict to the specification for balance, it can be considered that a type of balance weight be adopted, mainly, with which the balance weights are fitted in a plural number thereof, with shifting the position thereof from each other, however in a case when trying to perform the balance correction at high accuracy, in particular, applying an embedding method therein, in which the balance weights cannot be removed from after once being mounted thereon, for ensuring the space, in particular, it is necessary to correct or adjust an angle of attachment of those balance weights. However, in that instance, the balance weights must be slid with respect to the hub, or the one of the balance weights must be slid to the other one thereof, but fine particles or dusts are generated during the time of such the work. But, such the fine particles or dusts are formidable to the magnetic disk to which the represent invention relates, and then it is absolutely impossible to adopt such the method or technology.

In addition thereto, since attachment of those balance weights are conducted after determining the position thereof, while rotating it by a motor, then sufficient accuracy cannot be obtained, and for this reason, the correction vector fluctuates in the magnitude thereof. Although depending upon the specification for balance, but if such the fluctuation occurs in the magnitude of the correction vector, there may be a risk of bringing the balance of the disk to be unable to correct.

BRIEF SUMMARY OF THE INVENTION

Then, an object, according to the present invention made by taking such the problems of the conventional art as was mentioned above into the consideration, is to provide a disk apparatus equipped with a balance correction mechanism, enabling the balance correction at high accuracy, wherein mounting and removing the balance weight(s) needs a less space, and the balance weight will not come out due to the centrifugal force accompanying with the rotation, from a viewpoint of the structure thereof, thereby being able to perform the balance correction at high accuracy.

For accomplishing the object mentioned above, according to the present invention, first there is provided a disk device, to be attached onto a spindle motor, for rotary drive thereof, comprising: a disk-like recording medium; and a rotary portion, being formed in an about cylindrical shape, for holding said disk-like recording medium, wherein a balance weight receiving portion is formed on at least one of both end surfaces of said rotary portion in a direction of rotation shaft thereof, for receiving a balance weight in an inside thereof, said balance weight to be receive in said balance weight receiving portion has an elasticity and an outer configuration being about "C", and at least one of auxiliary weight is attached to a portion of said balance weight.

Also, according to the present invention, in the disk device, as described in the above, preferably, said auxiliary weight has an about "U" shaped shape in cross-section thereof, and said auxiliary weight is attached to the portion of said balance weight, in such a direction that an opening portion of said "U" shape directs from an inner periphery to an outer periphery of said "C" shaped balance weight, or said auxiliary weight has the elasticity, and is attached to said balance weight, with putting a portion of said balance weight between the "U" shaped portions in the cross-section thereof. Further, according to the present invention, in the place of the mentioned above, said auxiliary weight may be attached onto the portion said balance weight through welding, or bonding.

Further, according to the present invention, also for accomplishing the object mentioned above, there is provide an unbalance correcting method for a disk device, to be attached onto a spindle motor, for rotary drive thereof, comprising: a disk-like recording medium; and a rotary portion, being formed in an about cylindrical shape, for holding said disk-like recording medium, wherein a balance weight receiving portion is formed on at least one of both end surfaces of said rotary portion in a direction of rotation shaft thereof, for receiving a balance weight in an inside thereof, comprising the following steps of: preparing a balance weight having an outer configuration being about "C"; attaching at least one (1) piece of an auxiliary weight or more, in a portion of said balance weight; and attaching said balance weight, being attached with said auxiliary weight thereto, into an inside of said balance weight receiving portion.

Also, according to the present invention, in the unbalance correcting method for a disk device, as described in the above, configuration of about "C" is inserted into said balance weight receiving portion while being compressed into an inside thereof.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE INVENTION

Hereinafter, embodiments according to the present invention will be fully explained by referring to the attached drawings. First of all, FIG. 2 attached herewith shows the disk device according to an embodiment of the present invention, in particular, when the present invention is applied into a magnetic disk apparatus.

Figure 2:
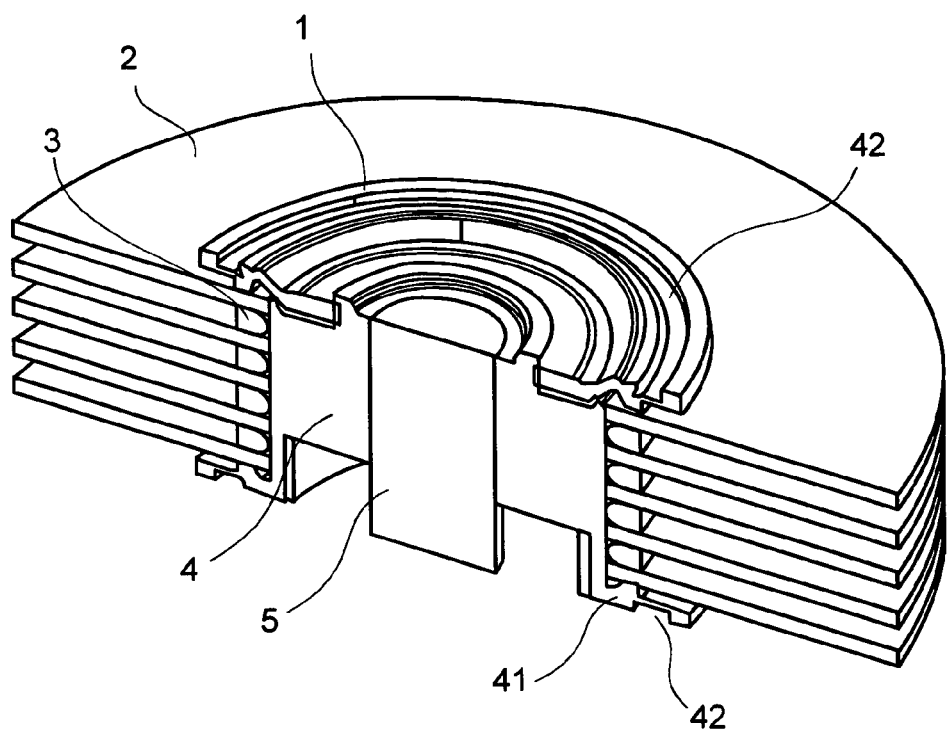
FIG. 2 is a perspective view for showing the detailed structure of the disk apparatus, such as, a magnetic disk apparatus, into which the present invention is applied, including a partial cross-section view thereof.

Namely, as shown in FIG. 2, normally, the disk device in the magnetic disk apparatus is constructed, for example, by stacking a plural number of disks and spacers onto a hub 4, one by one, around a cylindrical outer peripheral surface thereof, being formed from SUS or the like, for example, into a cylindrical shape in an outer configuration, and having a flange portion 41 at a lower portion thereof, and a clamp 1 is mounted on the stage at a top thereof, thereafter, being fixed onto the hub 4 through screws, etc., not shown in the figure. Those hub 4, disks 2, spacers 3 and the clamp 1 are supported or mounted on a shaft 5, which rotates through a shaft bearing, such as, a ball bearing, or a fluid bearing, etc.

However, in those rotary portions; such as, the hub 4, the disks 2, the spacers 3, and the clamp 1 (hereinafter, being called by a "rotary portion" collectively, including the spacers 3 and the clamp 1, therein), normally resides or remains an amount of unbalance, therein. Then, grooves 6 are formed in the hub 4, building up the rotary portion mentioned above (in particular, in the flange portion 41 formed at the lower portion thereof, in the example shown in the figure) and the clamp 1, so as to attach the balance weight within an inside thereof.

Figure 1:
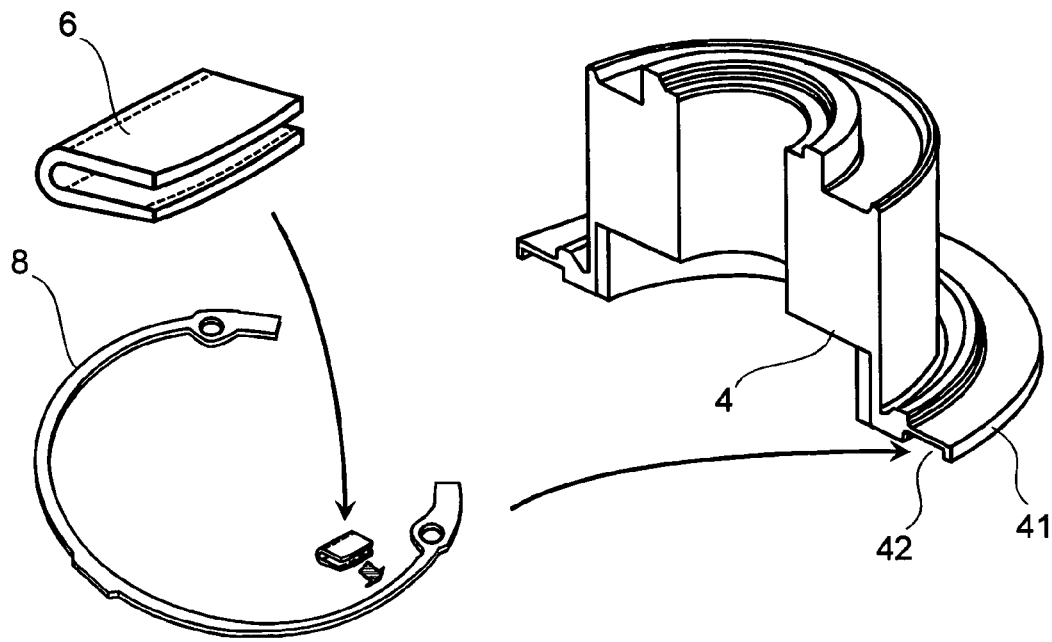
FIG. 1 is a perspective view for showing a rotary portion and a balance adjustment mechanism in a disk apparatus, according to an embodiment of the present invention, including a partial cross-section view thereof.

FIG. 1 shows the rotary portion of the disk device, which was explained in the above, and in particular, taking out only a portion of the hub 4 therefrom, and with reference to this, the structure of the balance adjustment mechanism will be explained in more details thereof, in the disk device, according to the present invention.

In the figure, the hub 4 building up the rotary portion of the disk device is formed into an about cylindrical shape in the outer configuration thereof, and has the disc-like flange portion 41 formed at the bottom portion thereof (i.e., the lower portion). Further, on the bottom surface of this flange portion 41, a groove 42 is formed, being rectangle in a shape of the cross-section thereof, on a concentric circular of the rotation shaft of that hub 4. Though not shown herein, however on the upper end surface of the hub 4, the clamp 1 (see FIG. 2) is attached on an outer periphery surface of the hub 4 after stacking the plural number of the disks 2 and the spacers 3 thereon, one by one. Further, a groove 42 similar to the above may be also formed on a top surface of the clamp 1, building up the rotary portion of the disk device together with the hub 4 mentioned above.

On the other hand, the balance weight 8 is formed into a "C" shape in the outer configuration thereof, and it is made up, by cutting out from a metal plate, having elasticity, such as, a steel plate, etc., for example, through a punching machine, etc. As is apparent from the figure, this "C" shaped balance weight 8 is made up, so that it is a little bit larger in an outer diameter than that of the groove 42 mentioned above, and it forms an arc being equal or greater than 180 degrees in the center angle thereof, thereby to prevent it from coming out after insertion into the groove 42 formed on the bottom surface of the hub 4, even under the non-rotating condition of the magnetic disk. Further, when attaching or mounting this "C" shaped balance weight, it is guided once into an inside of the groove 42, under the condition of being suppressed into an inside, so as to make small in the outer diameter thereof, and thereafter, the suppression force is removed therefrom. With this, the "C" shaped balance weight 8 is fixed into the groove 42, while pushing an outer periphery surface thereof towards an outer periphery wall surface of the groove 42, due to the elasticity thereof.

Further, in the figure is shown an auxiliary or a supplemental balance weight 6, being smaller in the shape than the "C" shaped balance weight 8 mentioned above, and according to the present invention, with an aid of using this auxiliary balance weight, it is possible to achieve the balance adjustment at further high accuracy, by using the "C" shaped balance weight therewith.

Namely, as is apparent from the figure, this auxiliary weight is formed into, such as, a "U"-like shape in the cross-section thereof, and has an outer configuration being rectangular plate-like. Also, this auxiliary weight 6, being similar to the "C" shaped balance weight 8, is made up from a metal plate or the like, having elasticity, such as, a steel plate, etc., for example.

When attaching such the auxiliary weight 6 onto the "C" shaped balance weight 8 mentioned above, first the "U"-like portion of the auxiliary weight 6 is opened, and it is attached while directing the opening portion thereof from an inner periphery to an outer periphery of the "C"-like shaped balance weight, as is shown in the figure. Thus, even in a case when the hub 4 rotates, and due to this, where the centrifugal force acts on the auxiliary weight 6, the "U"-like portion of the auxiliary weight 6 receives the force in such the direction, that it meshes or engages with the "C"-like shaped balance weight 8 mentioned above, thereby to be fixed thereon, further; therefore, it will not come out. Also, with utilizing the elastic force of the auxiliary weight 6 (i.e., a spring force), after being attached in a portion of the "C" shaped balance weight 8 by opening the "U"-like portion of the auxiliary weight 6, it is fixed thereon with putting the "C"-like shaped balance weight therebetween due to the spring force, even in the condition where it is inserted into the groove 42 of the hub 4, the auxiliary weight 6 is hardly shifted in the position of attachment thereof, easily, with respect to the "C"-like shaped balance weight 8.

Figure 4:
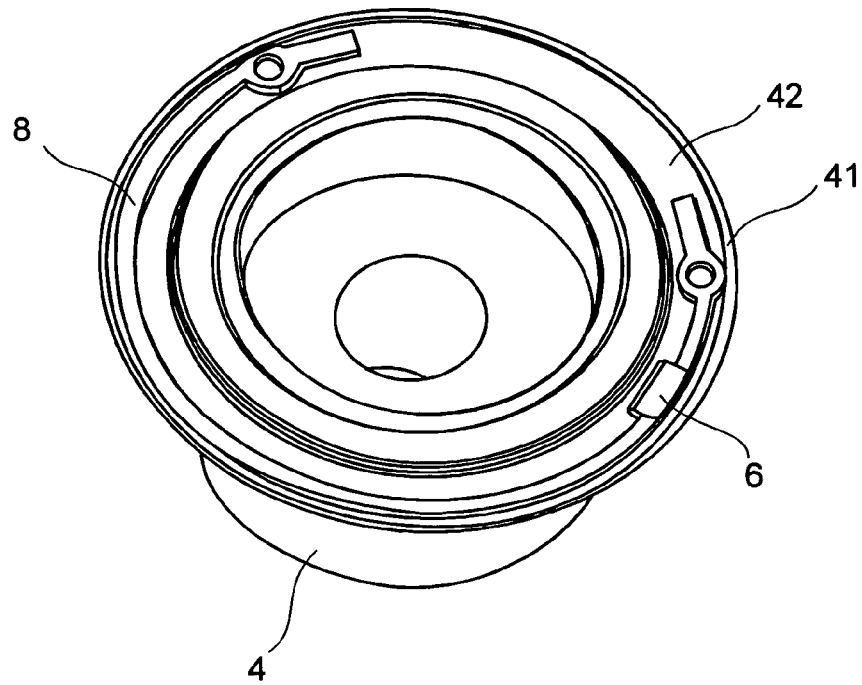
FIG. 4 is a perspective view from below for showing the condition where the balance weight is fitted within a groove on a hub, in the disk apparatus mentioned above.

Further, FIG. 4 attached herewith shows a condition where the balance weight 8 mentioned above is inserted into the groove 42 formed in the flange portion 41 of the hub 4, together with the auxiliary weight 6. Also, it is needless to say that the balance weight 8 mentioned above can be inserted into the groove 42 formed in the clamp 1 together with the auxiliary weight 6, in the similar manner as was mentioned above. In addition thereto, the auxiliary weight 6 may be attached onto the "C"-like shaped balance weight 8 mentioned above, not only one (1) position, but also a plural number of pieces thereof can be attached thereon.

Next, by referring to FIG. 3 attached, there is shown a method of correcting unbalance of the disk device mentioned above, by using the "C"-like shaped balance weight 8 mentioned above and the auxiliary weight 6 therewith.

Normally, when correcting the unbalance in the disk device, first the disk device is attached on a motor of a testing apparatus, thereby to be rotated, and through a predetermined calculation, an angle and a position are determined where the balance weight should be attached. In this instance, however only with the "C"-like shaped balance weight, it is not always possible to obtain a desired vector of an unbalance amount, therefore it is difficult to make the correction thereof at high accuracy. However, on the contrary to this, it may be considered that various types or shapes of the balance weights are prepared, so as to cope with all kinds of unbalances, which can be expected. However, with such, for practicing the correction actually on the unbalances at high accuracy, being required accompanying with such the high speed of the disk rotation of the disk device in the recent years, it is necessary to prepare the balance weights in advance, but in a very large number of types or shapes thereof; therefore it cannot be adopted, in particular, from an actual and practical viewpoint thereof.

Figure 3A:
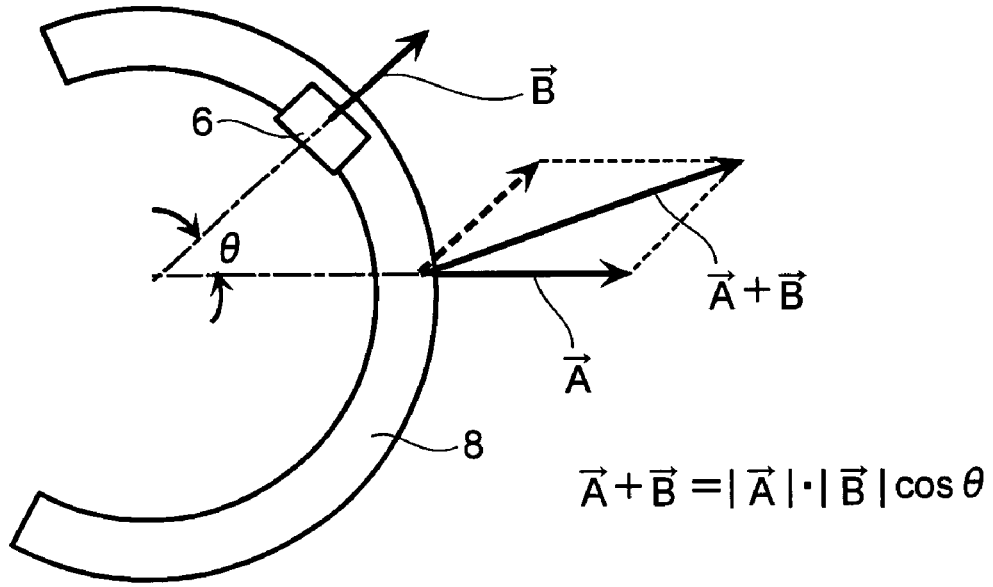
FIGS. 3(A) and 3(B) are views for explaining a principle of a method for correcting unbalance by means of a balance weight and an auxiliary weight, in the disk apparatus according to the present invention mentioned above.
Figure 3B:
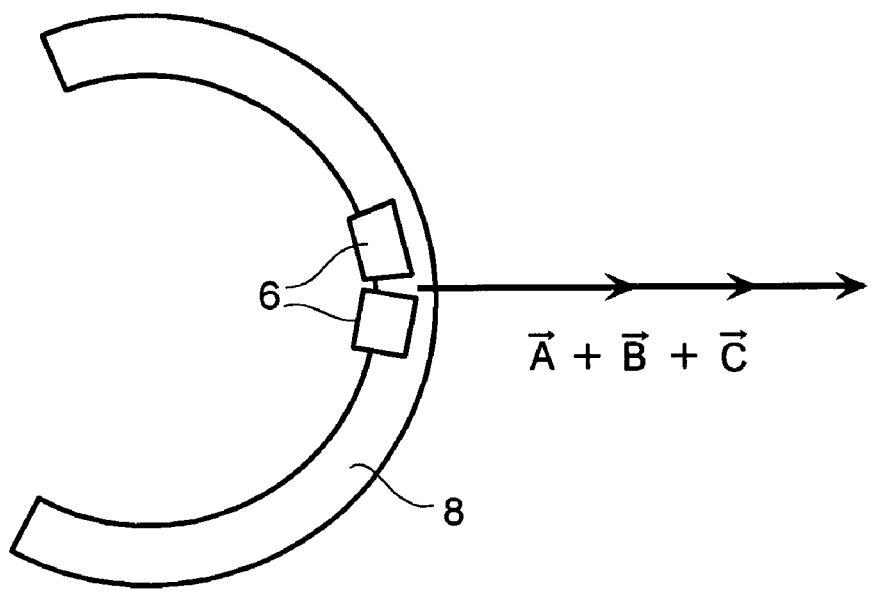

On the other hand, as was mentioned in the above, by using the "C" shaped balance weight 8 and the auxiliary weight(s) 6, as is shown in FIG. 3(A), for example, the auxiliary weight 6 is attached in a portion of an arc-like member building up the "C" shaped balance weight 8 mentioned above. With this, the correction vector obtained by means of the balance weight, being generated due to the centrifugal force when the disk device rotates, comes to be the sum of the correction vector obtained by means of the "C" shaped balance weight 8 and the vector of the auxiliary weight 6 attached thereon. Then, in case of adjusting the direction of the correction vector amount to be obtained, mainly, then the position is changed at which the auxiliary weight 6 is attached on. On the other hand, in case of adjusting the magnitude of the correction vector amount to be obtained, as is apparent from FIG. 3(B), it can be achieved by changing the number of the auxiliary weights 6 attached thereon.

In this manner, in accordance with the unbalance correction method for the disk device, with using such the "C" shaped balance weight 8 and the auxiliary weight 6 in combination thereof, according to the present invention, the following effects can be obtained, in particular, comparing to the technology of using the double "C" shaped balance weights, according to the conventional art mentioned above.

(a) An unbalance vector having an arbitrary magnitude can be obtained, with an aid of only a small number of parts, such as, the "C" shaped balance weight 8, and the auxiliary weight 6 as well. Normally, unevenness or fluctuation in assembling the balance weight, and further also the unevenness in a unit of the balance weight, shows a tendency of coming to be small as the balance weight itself is lightweight, however in the case where the "C" shaped balance weight 8 and the auxiliary weight 6 are used in the combination thereof, it is possible to amend or compensate the unevenness of the "C" shaped balance weight 8 itself, by attaching the auxiliary weight 6 thereto. Also, judging from the structure thereof, it is possible to make the balance weight light, comparing to the double balance weights.

(b) Using the "C" shaped balance weight 8, as well as, the auxiliary weight 6 in the combination thereof, according to the present invention, first an adjustment is made on the balance weight by attaching the auxiliary weight 6 onto the "C" shaped balance weight 8, and thereafter, those are inserted or fitted into the groove 42 of the rotary portion mentioned above, thereby enabling an adjustment of the balance weight at high accuracy. Namely, since the unbalance vector necessary for the correction can be formed or made up with the sum of vectors of the "C" shaped balance weight 8 and the auxiliary weight 6, it is possible to obtain the vector for correcting the unbalance, i.e., having an arbitrary magnitude and a direction thereof.

On the contrary to this, normally, with the double balance weights mentioned above, because of the type thereof, i.e., an imbedding type, then they cannot be detached from, and for this reason, the angle and the position of the balance weights are determined, after measuring the unbalance of the disk while rotating it by means of the motor. However, when positioning the double balance weights in the angle thereof, in particular, after the measurement, there is a problem that sufficient accuracy cannot be obtained only with this, as well as, that the metal powders are generated through the friction or abrasion mentioned above. In particular, when trying to change the magnitude of the correction vector, it is difficult to change it greatly.

Figure 5:
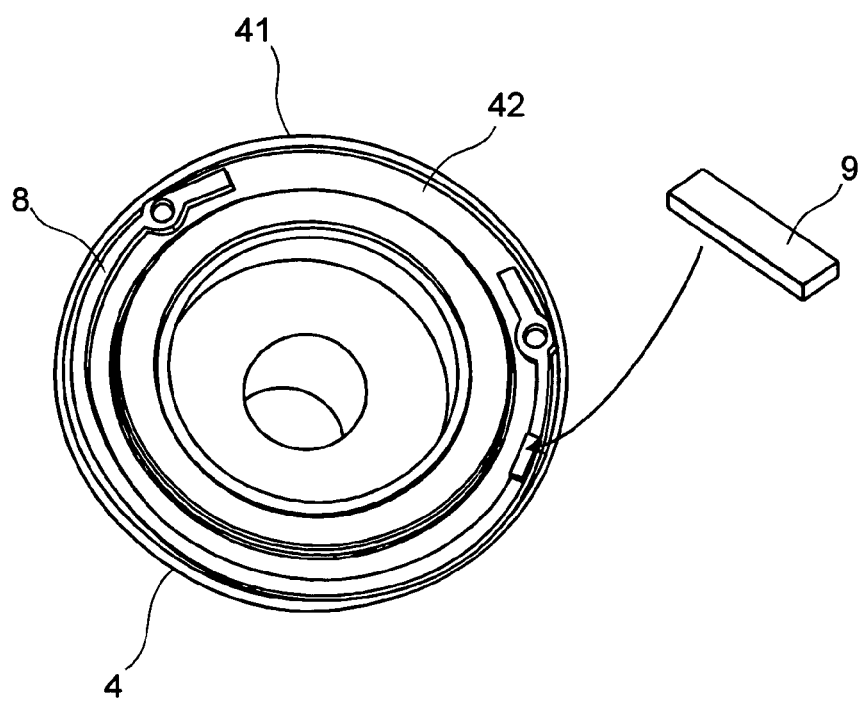
FIG. 5 is also a perspective view from below of the disk apparatus, for showing an example of a variation of the embodiment mentioned above.

Further, in the explanation given in the above, in the structure of assembling the auxiliary weight 6 onto the "C" shaped balance weight 8, it is explained the auxiliary weight 6 has the "U"-like shaped cross-section thereof. However, according to the present invention, it should not be restricted only to that structure mentioned above, but as is shown in FIG. 5 attached, for example, a plate-like member of a metal, being cut out into a predetermined size, may be attached thereon, as that auxiliary weight, through welding or bonding, etc. And, after forming the unbalance vector for correction, by adding the unbalance vector of the "C" shaped balance weight 8 and that of the auxiliary weight 9, those are attached or inserted into the groove 42 of the hub 4 mentioned above. However, in that instance, it is also same to the above, that the balance weight 8 is attached therein under the condition of being suppressed a little bit into an inside thereof.

Also, as was mentioned in the above, it is enough for the auxiliary weight 6 or 9 to achieve a function of an additional weight to the balance weight 8, and further, in the place of the structure mentioned above, it may be formed by dripping a solder or the like thereon, at an appropriate amount thereof. With this, only with a small number of the types or shapes of the balance weight (i.e., with only the balance weight 8), it is possible to form the unbalance vector for correcting at an arbitrary magnitude thereof. However, in this instance, thought it is impossible to make a repair on the balance weight 8 and the auxiliary weight 9, but the balance weight 8 can be detached from the hub 4, in relatively easy, therefore the repair can be performed.

As was fully mentioned in the above, according to the disk device and the unbalance correcting method for that, it is enough to use only (1) piece of the balance weight, therefore the space can be made small, necessary for performing the attachment and detachment thereof, and further, due to the function of the auxiliary weight attached on that balance weight, it is also possible to adjust the balance vector obtained in the direction and the magnitude thereof, at high accuracy, thereby accomplishing an effect that the disk device can be obtained, with which the swing-round vibration can be reduced, therefore enabling to fit to the high speed in the rotation thereof.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A disk device, to be attached onto a spindle motor for rotary drive thereof, comprising:
   a disk recording medium; and
   a rotary portion, having an essentially cylindrical shape, for holding said disk recording medium;
   wherein a balance weight receiving portion having a recess for a balance weight is formed on at least one of both end surfaces of said rotary portion about an axis of rotation thereof;
   wherein said balance weight to be received in said balance weight receiving portion is substantially in the shape of the letter "C"; and
   wherein at least one auxiliary weight is attached to a portion of said balance weight, said auxiliary weight having a rectangular shape and being smaller than said balance weight.

2. A disk device as described in claim 1, wherein said auxiliary weight has an substantially "U" shaped cross-section and is attached to the portion of said balance weight in such a direction that an opening portion of said "U" shape directs from an inner periphery to an outer periphery of said "C" shaped balance weight.

3. A disk device as described in claim 2, wherein said auxiliary weight has an elasticity and is attached to said balance weight such that a portion of said balance weight is between the "U" shaped cross-section thereof.

4. A disk device as described in claim 2, wherein said auxiliary weight is attached onto the portion of said balance weight through welding.

5. A disk device as described in claim 2, wherein said auxiliary weight is attached onto the portion of said balance weight through bonding.

6. An unbalance correcting method for a disk device having a disk recording medium and a rotary portion, having substantially cylindrical shape, for holding said disk recording medium, wherein a balance weight receiving portion having a recess for a balance weight is formed on at least one of both end surfaces of said rotary portion about an axis of rotation thereof, comprising the following steps of:
   preparing a balance weight in substantially the shape of the letter "C";
   measuring an unbalance of said rotary portion;
   attaching at least one auxiliary weight to a portion of said balance weight based upon the measured unbalance; and
   attaching said balance weight, having said at least one auxiliary weight attached thereto, into said recess of said balance weight receiving portion.

7. An unbalance correcting method for a disk device as described in claim 6, wherein:

said balance weight has an elasticity; and said balance weight is inserted into said recess while being compressed.

8. An unbalance correcting method for a disk device as described in claim 6, wherein said "C" shaped balance weight forms an arc having a center angle greater than or equal to 180 degrees.

9. An unbalance correcting method for a disk device as described in claim 6, wherein said disk recording medium is one of an optical disk or a magnetic disk.

10. An unbalance correcting method for a disk device as described in claim 6, wherein said "C" shaped balance weight is removable from said rotary portion.

11. A disk device as described in claim 1, wherein said "C" shaped balance weight forms an arc having a center angle greater than or equal to 180 degrees.

12. A disk device as described in claim 1, wherein said disk recording medium is one of an optical disk or a magnetic disk.

13. A disk device as described in claim 1, wherein said "C" shaped balance weight is detachable from said rotary portion.

14. A disk device, to be attached onto a spindle motor for rotary drive thereof, comprising:

a disk recording medium; and a rotary portion, having a substantially cylindrical shape, for holding said disk recording medium;

wherein a balance weight receiving portion having a recess for a balance weight is formed on at least one of both end surfaces of said rotary portion in a direction of rotation thereof;

wherein said balance weight to be received in said balance weight receiving portion is formed from a metal plate cut substantially in the shape of the letter "C"; and wherein at least one auxiliary weight is attached to a portion of said balance weight, said auxiliary weight having a rectangular shape and being smaller than said balance weight.

15. A disk device as described in claim 14, wherein said "C" shaped balance weight forms an arc having a center angle greater than or equal to 180 degrees.

16. A disk device as described in claim 14, wherein said disk recording medium is one of an optical disk or a magnetic disk.

17. A disk device as described in claim 14, wherein said "C" shaped balance weight is removable from said rotary portion.

* * * * *